United States Patent
Oriol et al.

(10) Patent No.: US 11,698,004 B2
(45) Date of Patent: Jul. 11, 2023

(54) AIRCRAFT PROPULSION ASSEMBLY COMPRISING AIR-LIQUID HEAT EXCHANGERS

(71) Applicants: SAFRAN AIRCRAFT ENGINES, Paris (FR); SAFRAN NACELLES, Gonfreville-L'Orcher (FR)

(72) Inventors: Sébastien Oriol, Moissy-Cramayel (FR); Mohammed-Lamine Boutaleb, Moissy-Cramayel (FR); Vincent Jean-François Peyron, Moissy-Cramayel (FR)

(73) Assignees: SAFRAN AIRCRAFT ENGINES, Paris (FR); SAFRAN NACELLES, Gonfreville-l'Orcher (FR)

( * ) Notice: Subject to any disclaimer, the term of this patent is extended or adjusted under 35 U.S.C. 154(b) by 371 days.

(21) Appl. No.: 16/607,053

(22) PCT Filed: Apr. 12, 2018

(86) PCT No.: PCT/EP2018/059478
§ 371 (c)(1),
(2) Date: Oct. 21, 2019

(87) PCT Pub. No.: WO2018/197232
PCT Pub. Date: Nov. 1, 2018

(65) Prior Publication Data
US 2020/0049028 A1    Feb. 13, 2020

(30) Foreign Application Priority Data

Apr. 24, 2017   (FR) ...................................... 1753539

(51) Int. Cl.
*F02C 7/14*     (2006.01)
*F01D 25/14*    (2006.01)
(Continued)

(52) U.S. Cl.
CPC ............. *F01D 25/14* (2013.01); *B64D 29/00* (2013.01); *F02C 7/18* (2013.01); *F02C 7/14* (2013.01); *F05D 2260/213* (2013.01)

(58) Field of Classification Search
CPC ......................................................... F02C 7/14
See application file for complete search history.

(56) References Cited

U.S. PATENT DOCUMENTS 3,797,561 A * 3/1974 Clark .................... F28D 1/0308
                                                      60/39.08
3,818,696 A * 6/1974 Beaufrere ................ F02C 7/22
                                                       60/737
(Continued)

FOREIGN PATENT DOCUMENTS

| FR | 3001253 A1 | 7/2014 |
| FR | 3027624 A1 | 4/2016 |
| FR | 3039208 A1 | 1/2017 |

OTHER PUBLICATIONS

International Search Report dated Jun. 7, 2018, issued in corresponding International Application No. PCT/EP2018/059478, filed Apr. 12, 2018, 6 pages.
(Continued)

*Primary Examiner* — Todd E Manahan
*Assistant Examiner* — Marc J Amar
(74) *Attorney, Agent, or Firm* — Christensen O'Connor; Johnson Kindness PLLC

(57) ABSTRACT

An aircraft propulsion assembly includes a turbine engine surrounded by a nacelle with an annular air-intake lip extending around the turbine engine by two annular walls, inner and outer, respectively, intended for being swept across by air flows at least when the aircraft is in flight. The inner and outer walls each includes or supports at least one network of pipes forming heat exchangers. The inner wall pipe network having liquid outlet connected with a liquid (Continued)

intake of the outer wall pipe network. The propulsion assembly further includes means for circulating the liquid, connected to at least one liquid intake of the network of pipes of the inner wall.

17 Claims, 5 Drawing Sheets

(51) Int. Cl.
*B64D 29/00* (2006.01)
*F02C 7/18* (2006.01)

(56) References Cited

U.S. PATENT DOCUMENTS

| | | | | |
|---|---|---|---|---|
| 3,939,904 | A * | 2/1976 | Beaufrere | F02C 3/14 165/10 |
| 5,228,643 | A * | 7/1993 | Manda | B64D 15/02 244/134 B |
| 8,387,362 | B2 * | 3/2013 | Storage | F01D 25/24 415/208.1 |
| 2001/0032477 | A1 * | 10/2001 | Schlom | F28F 3/046 62/310 |
| 2005/0006529 | A1 * | 1/2005 | Moe | B64D 33/02 244/134 D |
| 2007/0264133 | A1 * | 11/2007 | Schwarz | F01D 25/18 62/7 |
| 2008/0053060 | A1 * | 3/2008 | Olver | F02C 7/14 60/226.1 |
| 2009/0165995 | A1 * | 7/2009 | Bajusz | F28F 1/022 60/266 |
| 2013/0177410 | A1 * | 7/2013 | Eleftheriou | F02C 7/14 60/226.1 |
| 2013/0306265 | A1 * | 11/2013 | Appukuttan | F28F 27/02 165/11.1 |
| 2014/0205446 | A1 | 7/2014 | Patsouris et al. | |
| 2014/0209286 | A1 | 7/2014 | Freund et al. | |
| 2016/0114898 | A1 | 4/2016 | Llamas Castro et al. | |
| 2016/0131036 | A1 | 5/2016 | Bintz et al. | |
| 2017/0184024 | A1 * | 6/2017 | Sennoun | F02K 3/06 |

OTHER PUBLICATIONS

Written Opinion of the International Searching Authority dated Jun. 7, 2018, issued in corresponding International Application No. PCT/EP2018/059478, filed Apr. 12, 2018, 6 pages.

Written Opinion of the International Searching Authority dated Jun. 7, 2018, issued in corresponding International Application No. PCT/EP2018/059478, filed Apr. 12, 2018, 7 pages.

International Preliminary Report on Patentability dated Oct. 29, 2019, issued in corresponding International Application No. PCT/EP2018/059478, filed Apr. 12, 2018, 1 page.

* cited by examiner

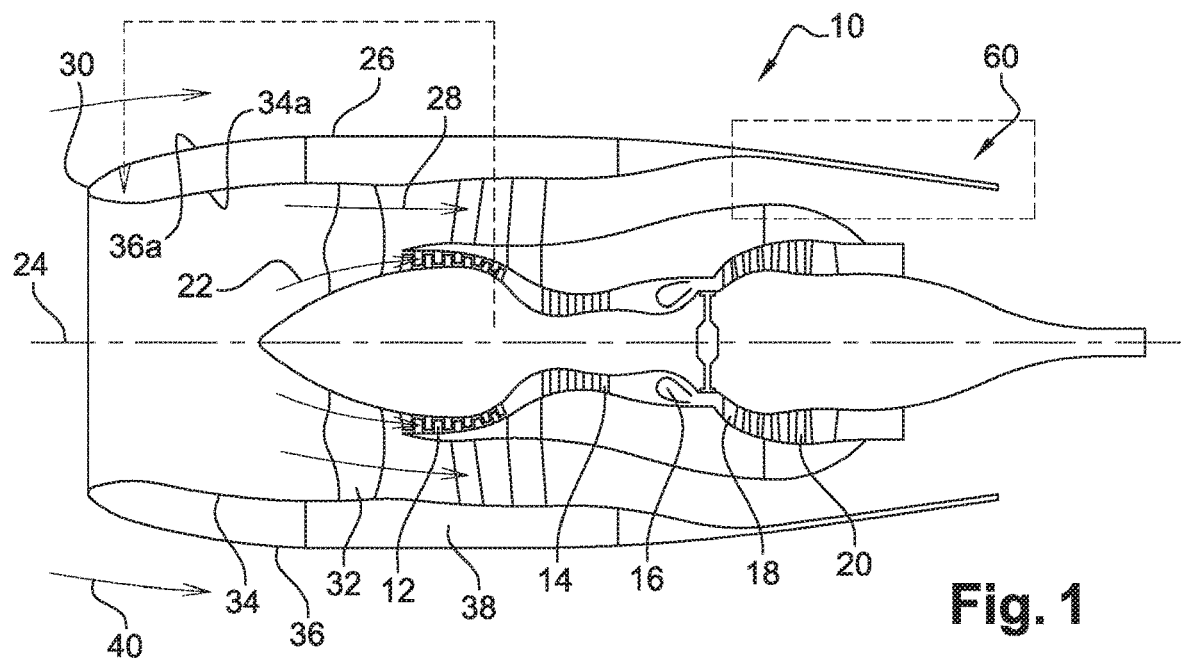
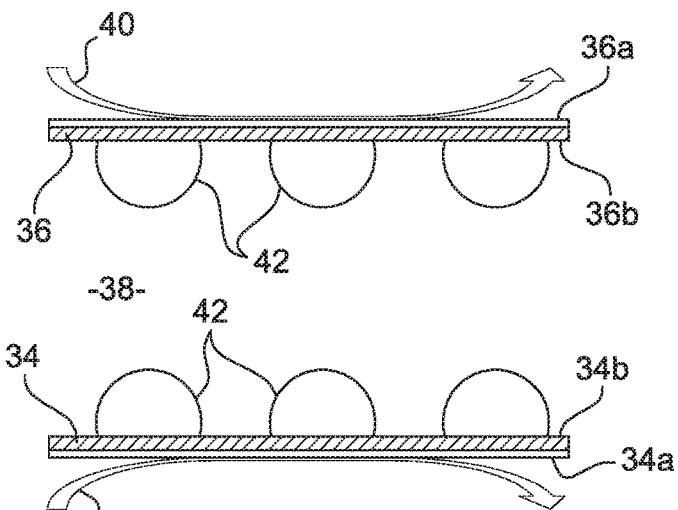
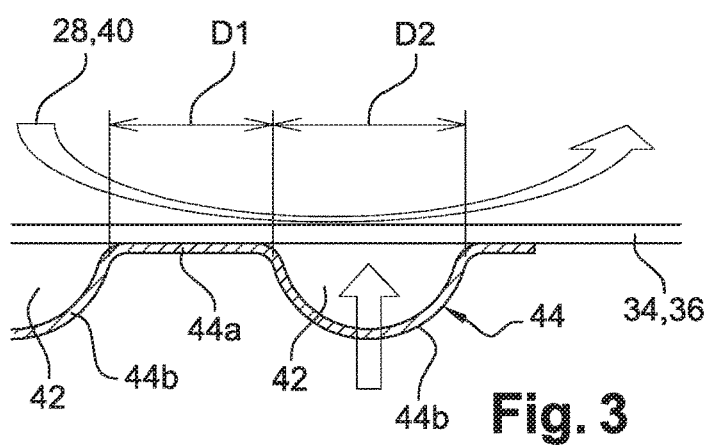
Fig. 1
Fig. 2
Fig. 3

AIRCRAFT PROPULSION ASSEMBLY COMPRISING AIR-LIQUID HEAT EXCHANGERS

TECHNICAL FIELD

This invention concerns an aircraft propulsion assembly comprising air-liquid heat exchangers, in particular air-oil.

BACKGROUND

The prior art includes, in particular, the documents FR-A1-3 001 253, FR-A1-3 027 624, US-A1-2016/131036, US-A1-2009/165995, FR-A1-3 039 208 and US-A1-2014/209286.

An aircraft propulsion assembly comprises an engine of the turbomachine type which is surrounded by a nacelle, said nacelle comprising an annular air intake lip, particularly in the engine.

In the case of the turbomachine is a dual-flow turbine engine, the air flow that passes through the air intake lip when the aircraft is in flight passes through a fan blade and then splits into a primary air flow that enters the turbomachine and a secondary air flow that flows around the turbomachine, inside the nacelle.

The air intake lip extends downstream around the turbomachine by two coaxial annular walls, inner and outer, respectively, of the nacelle. The inner wall of the nacelle externally delimits the annular flow channel of the secondary flow and is therefore swept across by this flow during operation. The outer wall of the nacelle is swept away by the air flow that flows around the nacelle during operation.

wear elements of the turbomachine, such as the bearings, must be constantly lubricated. The oil used to lubricate and cool the bearings can reach high temperatures and must be cooled. It is known to use an air-oil heat exchanger to cool the hot oil before reusing it in the engine. The exchanger can be of the SACOC (Surfacic Air Cooled Oil Cooler) type which has projecting fins intended to be swept by a cooling air flow or of the ACOC (Air Cooled Oil Cooler) type which comprise a surface intended to be swept by a cooling air flow. These air/oil exchangers are currently intended to be swept across by the secondary flow flowing inside the nacelle, which tends to increase the pressure drops and contribute to the overall efficiency decrease of the turbomachine.

This invention proposes an improvement to this technology, which is simple, efficient and economical.

SUMMARY OF THE INVENTION

For this purpose, the invention proposes a propulsion assembly for aircraft, comprising a turbomachine surrounded by a nacelle comprising an annular air intake lip extending around the turbomachine by two annular walls, inner and outer, respectively intended for being swept across by air flows at least when the aircraft is in flight, characterized in that:

said inner and outer walls each comprise or support at least one network of pipes intended for transporting a liquid in contact with said inner wall or said outer wall, so as to form air-liquid heat exchangers respectively inner and outer, the pipes of each inner or outer heat exchanger being connected in parallel with each other, a network of pipes of the inner wall having at least one liquid outlet connected in series with at least one liquid intake of a network of pipes of the outer wall, and the propulsion assembly comprises means for circulating the liquid, connected to at least one liquid intake of a network of pipes of the inner wall for its liquid supply, and connected to at least one liquid outlet of a network of pipes of the outer wall for the recovery of the liquid.

As part of the search for new heat exchange surfaces in a turbomachine, a cooling system for a liquid, such as engine oil, in contact with the secondary air flow and the external air flow with a low aerodynamic impact has been developed. This system consists of using the inner and outer walls of the nacelle as exchange surfaces between the liquid and air. The purpose of this invention is thus to propose a liquid circulation architecture at the level of the walls of the so-called "cooling" nacelle by optimizing the power dissipated and pressure drop generated couple, as well as the on-board mass.

The propulsion assembly, according to the invention, may include one or more of the following characteristics, taken in isolation from each other or in combination with each other:

the turbomachine is connected to the nacelle by at least one passage of ancillaries tubular arm, said at least one liquid intake of a network of pipes of the inner wall and said at least one liquid outlet of a network of pipes of the outer wall being substantially located at the level of this arm, said arm is located at 12 o'clock by analogy with the dial of a clock, said networks have a generally curved or annular shape and extend around each other, the networks are segmented and each comprises at least two sectors, each of said pipes comprises two sectors of approximately 180° each, said networks include pipes extending at least in part substantially parallel to a longitudinal axis of the propulsion assembly or of the turbomachine, said at least one liquid outlet of the network of pipes of the inner wall is connected to said at least one liquid intake of the network of pipes of the outer wall by at least one collector, said at least one liquid outlet of the network of pipes of the inner wall is connected to a first inner collector and said at least one liquid intake of the network of pipes of the outer wall is connected to a second outer collector, said first and second collectors being connected together by one or more lines extending substantially radially with respect to said axis, said liquid intake of the network of pipes of the inner wall is connected to a feed ramp and said liquid outlet of the network of pipes of the outer wall is connected to a collection ramp, at least one sheet metal is mounted and fixed, for example by brazing or welding, to each of said inner and outer walls and is shaped to define said network of pipes corresponding to that wall, and the collectors and/or ramps are mounted and fixed, for example by brazing or welding, to the said inner and outer walls.

DESCRIPTION OF THE FIGURES

The invention shall be better understood and other details, characteristics and advantages of the invention shall appear more clearly when reading the following description by way of non-limitative example and with reference to the annexed drawings in which:

FIG. 1 is a schematic axial cross-sectional view of a propulsion assembly,

FIG. 2 is a very schematic axial cross-sectional half-view of a part of a nacelle of a propulsion assembly according to the invention, FIG. 3 is a larger scale view of a detail from the FIG. 2.

DETAILED DESCRIPTION

Figure 4:
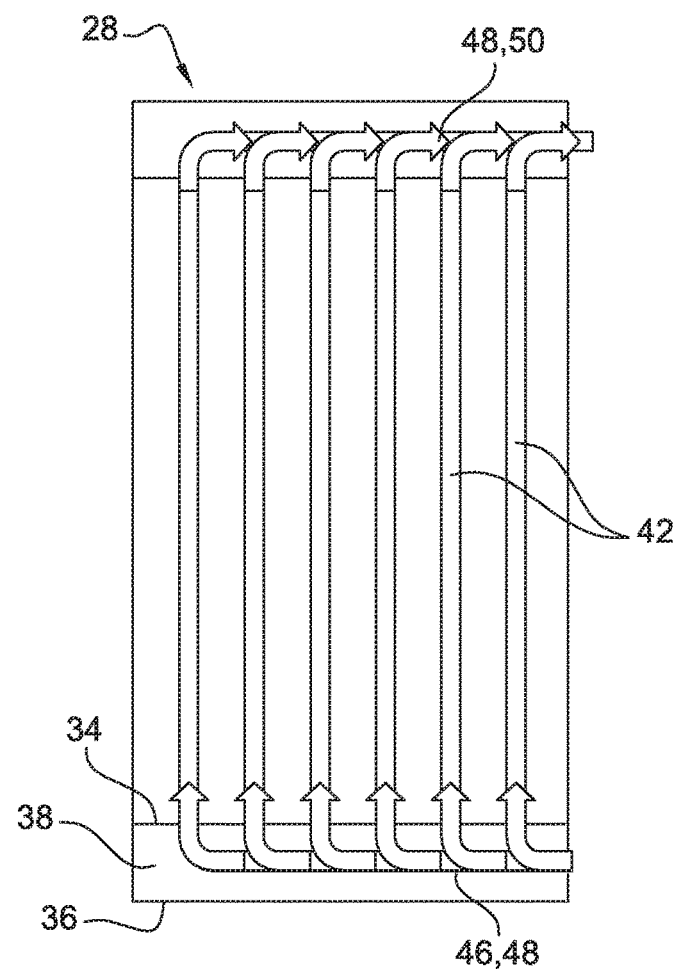
FIG. 4 is a schematic axial cross-sectional view of a nacelle of a propulsion assembly according to the invention, FIGS. 5 and 6 include block diagrams illustrating the principles of oil circulation between the inner and outer walls of a nacelle.

A propulsion assembly 10 comprises an engine or turbomachine that is surrounded by a nacelle.

With reference to FIG. 1, the turbomachine is a dual-flow, dual-body turbine engine that includes, from upstream to downstream in the direction of the flow of gases, a low-pressure compressor 12, a high-pressure compressor 14, a combustion chamber 16, a high-pressure turbine 18 and a low-pressure turbine 20, which define a flow channel for a primary gas flow 22.

The rotor of the high pressure turbine 18 is connected with the rotor of the high pressure compressor 14 so as to form a high pressure body, while the rotor of the low pressure turbine 20 is connected with the rotor of the low pressure compressor 12 so as to form a low pressure body. The rotor of each turbine rotates the rotor of the associated compressor about an axis 24 under the influence of the thrust of the gases from the combustion chamber 16.

The nacelle 26 extends around the turbomachine and defines around it an annular flow channel of a secondary flow 28. The upstream end of the nacelle 26 defines an annular air intake lip 30 into which an air flow enters, which passes through a fan 32 of the turbomachine, to then divide and form the primary 22 and secondary 28 flows mentioned above.

The lip 30 has a generally C-shaped axial half-section, an opening of which being oriented axially downstream. The inner and outer annular edges of the lip are connected respectively to the inner 34 and outer 36 annular walls of the nacelle. The walls 34, 36 extend around each other and are radially spaced from each other to define an annular space 38 which is used to mount equipment for the propulsion assembly 10.

As shown in FIG. 1, the inner wall 34 has its radially inner surface 34a which externally defines the flow channel of the secondary flow 28, which is swept across by this secondary flow. The outer wall 36 has its radially outer surface 36a which is swept across by the air flow flowing around the turbomachine in operation (arrows 40).

FIGS. 2 to 4 illustrate one of the aspects of the invention consisting of providing air-liquid heat exchangers, and preferably air-oil, on the walls 34, 36 of the nacelle 26. A first heat exchanger is provided on the radially outer surface 34b of the inner wall 34 in view of the circulation of the liquid or oil on this wall and the heat exchange directly with this wall 34 swept across by the secondary flow 28. A second heat exchanger is provided on the radially inner surface 36b of the outer wall 36 in view of the circulation of the liquid or oil on this wall and the heat exchange directly with this wall 36 swept by the air flow 40.

For this purpose, the walls 34, 36 include or carry the networks of pipes 42 of oil. The network(s) on each wall each include several pipes connected in parallel with each other. Each network of pipes forms an air-liquid heat exchanger on the inner wall 34 or the outer wall 36. In the case where several such heat exchangers are provided on the inner wall 34 and/or the outer wall 36, the heat exchangers of a same inner or outer wall may be connected fluidly to each other in series or in parallel.

The pipes can have at least in part a general axial orientation and thus extend substantially parallel to the axis 24 over a part of the length. In this case, the cutting of FIGS. 2 and 3 would be done substantially perpendicular to the axis 24.

Alternatively, the pipes may have at least partially an annular or circumferential general orientation extending around the axis 24. In this case, the cross-section of the FIGS. 2 and 3 would be made in a plane passing through axis 24. In the latter case, the pipes could be placed next to each other along axis 24 (FIG. 4).

The pipes 42 are advantageously connected with the corresponding wall 34, 36.

In the example shown in FIGS. 2 and 3, the pipes of each wall 34, 36 are formed by a sheet metal 44 mounted and fixed, for example by brazing or welding, to the corresponding wall (FIG. 3). Each sheet metal 44 is shaped, for example by stamping, to include first substantially flat annular portions 44a applied and fixed to the above-mentioned surface of the corresponding wall, and second annular portions 44b with curved axial section defining the pipes 42 with the corresponding wall.

The dimensions D1, D2 of portions 44a, 44b and in particular the inner volumes of pipes 42 are predetermined parameters according to the performance required for the exchangers.

The surfaces 34a, 36a in direct contact with the air flows (secondary flow 28 or external flow 40) are not advantageously modified in order not to generate additional aerodynamic losses compared to a conventional nacelle, which would lead to additional fuel consumption to compensate for these losses.

The oil supply to pipes 42 is preferably done through the inner space 38 of the nacelle (FIG. 4). The inner geometry of the power supply should also preferably respect the acoustic and manufacturability constraints, which results in limiting the dimensions D1 and D2.

At the level of a same surface 34b, 36b, the pipes are supplied in parallel by a collector 48 or a feed ramp 46. The oil is then collected in a collector 48 or a collection ramp 50 connected in parallel on all the pipes. Thus, in the embodiment shown in FIG. 4, the feed ramp 46 and collection ramp 50 both form a part of means for circulating liquid (oil). The pipes of each exchanger are also connected in parallel with each other.

The assembly comprising the pipes 42, i.e. the sheets metal 44, ramps and collectors are preferably welded or brazed to the corresponding surface of the wall 34, 36.

The secondary 28 and the external 40 flows are different in terms of temperature, velocity, etc., so the conditions to which the surfaces 34a, 36a are exposed are heterogeneous. It is therefore necessary to design a power supply architecture that maximizes the thermal power dissipated at all flight points. The dimensions D1 and D2 are an integral part of the design because these parameters directly influence the flow rate distribution and pressure drops in the oil.

The objective is preferably to find the optimum between the following three parameters: evacuated thermal power, pressure drop and mass of on-board liquid. The liquid is preferably engine oil, but the use of a heat transfer liquid other than oil is possible in order to cool the engine oil through a dedicated oil/heat transfer liquid heat exchanger. The heat transfer fluid can be the liquid phase of a two-phase fluid supplying the pipes 42.

Figure 5:
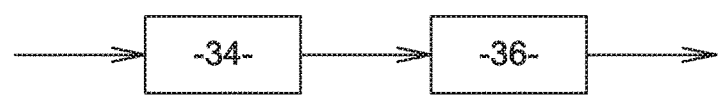
Figure 6:
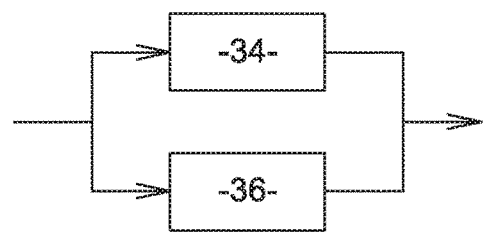

The study of two distinct surfaces, the exterior surface 36a and the interior surface 34a, allows us to know the trends of possible architectures. Two modes of oil supply to these two surfaces were considered: series (FIG. 5) or parallel (FIG. 6).

In the case of the series (FIG. 5), it is preferable to first supply the inner wall 34 and then the outer wall 36. This choice is explained by the fact that it maximizes the temperature difference between air and oil to obtain the maximum heat exchange.

The outer surface 36b has a lower air temperature than in the secondary flow 28, but has a lower convection coefficient. Thus, the cooling of the oil which takes place at the level of the inner surface 34a (by exchange with the secondary flow 28) still allows to maintain a sufficient temperature difference between the air and the oil for the exchange at the level of the outer surface 36a.

In the parallel case (FIG. 6), the geometry of the pipes of the two walls defines the distribution of the flow rate between these walls. However, the phenomenon of flow rate heterogeneity can occur and make it difficult to control this distribution. Indeed, the exchange between two surfaces not working under the same conditions can lead to changes in the viscosity of the oil in the pipes. This can lead to a change in the flow rate distribution between the two surfaces, which is difficult to predict over the entire flight domain.

Figure 7:
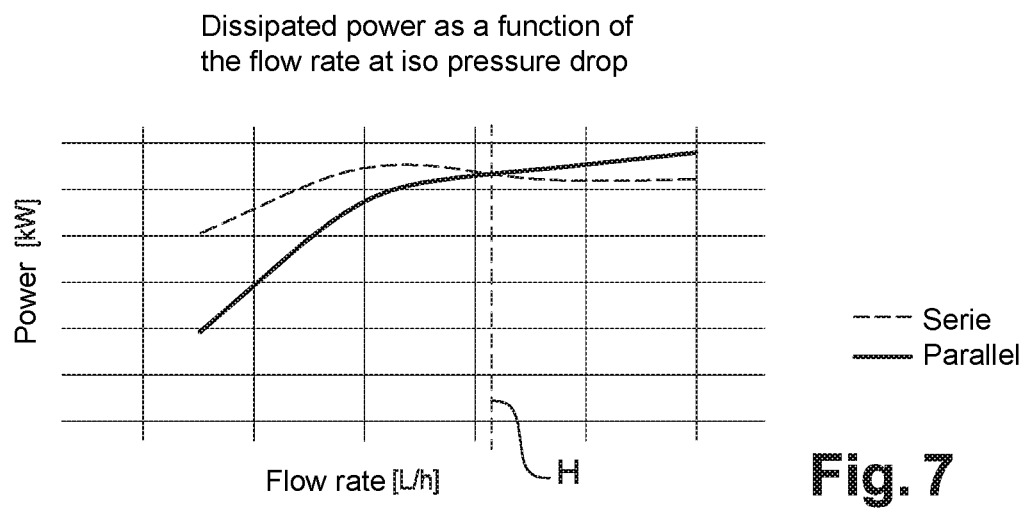
FIG. 7 is a graph illustrating the evolution of the dissipated power as a function of the flow rate at iso pressure drop during oil cooling for each of the principles of FIGS. 5 and 6, FIG. 8 includes a block diagram illustrating the principle of oil circulation retained between the inner and outer walls of a nacelle.

The choice of a parallel or series architecture will depend on the power exchanged/pressure drop couple. Two flow rate zones can be distinguished that define the use of the architectures (see FIG. 7).

It should be noted that from a certain flow rate H, the use of a parallel architecture is more interesting from a thermal point of view. However, the complexity of a parallel architecture (management of flow rate distribution and flow rate heterogeneities) shows that from a global point of view, it is more interesting to use a series architecture even if it generates less power dissipation.

Especially since the power difference is not significant beyond this flow rate value H.

The flow rate value H that justifies the transition from a series architecture to a parallel architecture is very high. As part of a cooling nacelle 26, the average flow rate seen by the surfaces of the nacelle is much lower than the architecture transition flow rate. The architecture that connects the pipes of the inner and outer walls in series is therefore retained.

In the case of several heat exchange surfaces, it is therefore preferable to use a series architecture between the surfaces as much as possible in order to keep an architecture simple and efficient. However, the series connection of all the surfaces used would generate a much too high pressure drop in the exchanger. Currently, the pressure limitation in the pipes of the nacelle forces the use of a maximum of two surfaces in series.

If all surfaces are connected in parallel, the power dissipation is too low. Indeed, each surface would be supplied by a low flow rate that would reduce the convective exchange coefficient of the oil. In addition, the architecture would be heavily influenced by the heterogeneity of flow rates between the inner and outer surfaces.

Figure 8:
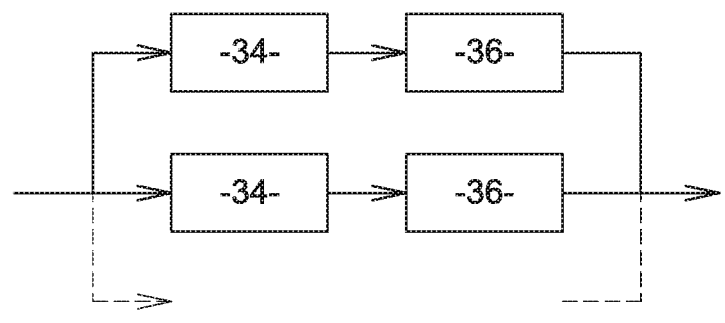

In order to limit flow rate heterogeneities and to homogenize the heat exchanges between the different pipes, it is more interesting to use an architecture composed of portions of two surfaces in series (inner surface followed by an outer surface) that will be supplied in parallel, as shown in FIG. 8.

This architecture allows an optimal supply of the surfaces and has been retained within the framework of the use of the cooling nacelle. Indeed, for the same surfaces used, the series architecture of all surfaces generates too much pressure drop and is therefore not possible. The parallel architecture would not dissipate enough thermal power. This is why the chosen architecture optimizes the thermal power/pressure drop couple by adopting a mixed series and parallel architecture.

Thus, the network of pipes 42 of the inner wall 34 has one or more oil outlets connected in series with one or more oil intakes of the network of pipes of the outer wall 36. In the case where the inner wall 34 includes two or at least three networks of pipes 42 connected in series, the oil outlet(s) concerned are those of the last network of pipes 42 of this wall in the direction of the circulation of the oil. The propulsion assembly includes means for circulating oil from the turbomachine, connected to one or more oil intakes of the network of pipes of the inner wall for parallel oil supply to these intakes, and connected to one or more oil outlets of the network of pipes of the outer wall for parallel oil collection from these outlets. As mentioned above, in the case in which the outer wall 36 includes two or at least three networks of pipes 42 connected in series, the oil intake(s) concerned are those of the first network of pipes 42 of this wall in the direction of circulation of the oil and the oil outlet(s) concerned are those of the last network of pipes 42 of this wall in the direction of the circulation of the oil.

Figure 9:
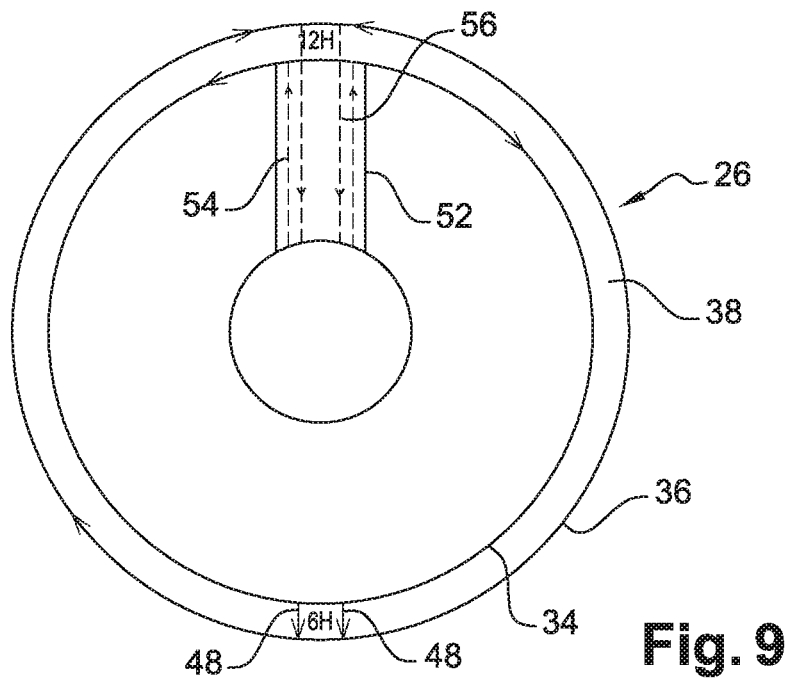
FIG. 9 is a schematic transverse cross-sectional view of a propulsion assembly nacelle according to the invention.

In the example of embodiment illustrated in FIG. 9, the inner wall 34 carries at least two networks of pipes that extend over approximately 180° each. It could also be considered that the inner wall includes a single, segmented network of pipes, the network comprising sectors of pipes extending over approximately 180° each. Similarly, the outer wall 36 carries at least two networks of pipes that extend over approximately 180° each. It could also be considered that the outer wall includes a single, segmented network of pipes, the network comprising sectors of pipes extending over approximately 180° each.

Figure 10:
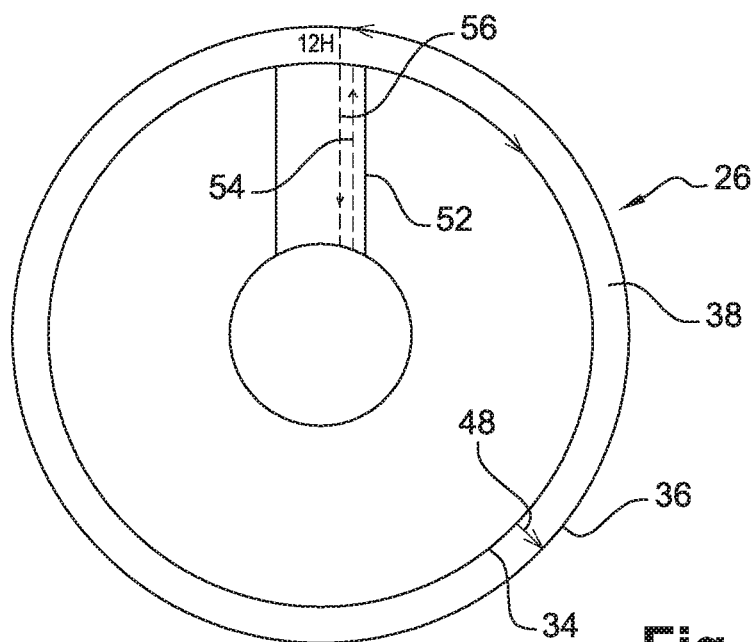
FIG. 10 is a schematic transverse cross-sectional view of another embodiment of a propulsion assembly nacelle design according to the invention.

The turbomachine is connected to the nacelle 26 by at least one tubular arm 52 for the passage of ancillaries. Among these ancillaries, oil lines 54, 56 can be provided, in particular an oil leaving line 54 extending substantially radially inside the arm 52 and allowing the hot oil from the engine to be brought in the direction of the heat exchangers of the nacelle, and an oil return line 56 also extending substantially radially inside the arm and allowing cooled oil from the heat exchangers to be brought to the engine for reuse to lubricate and/or cool engine components such as bearings. Thus, in the embodiment shown in FIGS. 9 and 10, the arm 52 and oil line 54 both form a part of means for circulating liquid (oil). These oil leaving and return lines 54, 56 are shown in FIGS. 9 and 10 as dotted lines.

The oil leaving line 54 is connected to the pipes of the inner wall 34 by at least one feed ramp 46 (FIG. 4). In the case where the arm 52 is located at 12 o'clock by analogy with a clock dial, the ramp 46 is also located at 12 o'clock at the radially outer end of the arm. The oil return line 56 is connected to the pipes on the outer wall by at least one collection ramp, such as for example a ramp 50 (FIG. 4), which is also located at 12 o'clock in the above example. In general, it may be preferable to have a single feed ramp and a single collection ramp, in order not to penalize the overall size and mass of the system. The two ramps can possibly be formed in the same part.

The oil outlets of the network of pipes of the inner wall are connected to the oil intakes of the outer wall of the network of pipes by the collectors 48 located at 6 o'clock in the above example. In the example shown, there are two collectors due to the division of each network of pipes into two sectors: a first collector for connecting the first pipe sectors of the network of pipes of the inner wall to first pipe sectors of the network of pipes of the outer wall, and a second collector for connecting second pipe sectors of the network of pipes of the inner wall to second pipe sectors of the network of pipes of the outer wall. In the example shown, a first liquid cooling circuit formed by the first pipe sectors is symmetrical with a second liquid cooling circuit formed by the second pipe sectors, with respect to a median longitudinal plane of the nacelle. This plane is also a symmetry plane for the ancillaries arm 52, and is therefore vertical in the above example.

The mixed architecture allows to minimize the number of pipes by the circulation of the oil as a first step at the level of the inner wall (going from 12 h to 6 h) and then at the level of the outer wall (returning path from 6 h to 12 h).

Of course, the connection of the pipes of the first and second liquid cooling circuits to the means of the circulation of the oil from the turbomachine is not necessarily at 12 o'clock. It depends on the orientation of the ancillaries arm 52 through which the oil leaving and return lines 54, 56 pass. In addition, the connection of the pipe sectors by the collectors 48 is not necessarily at 6 hours. It depends in particular on the angular extent of the pipe sectors. In the case where each of the first and second liquid cooling circuits includes two sectors of pipes of about 180°, the collectors are located at 6 o'clock.

The collectors 48 for connecting the pipe sectors of the inner and outer walls can each be "single-body" and extend throughout the radial space between the walls 34, 36 of the nacelle. Alternatively, each single-body collector could be replaced by a collector in two parts: an inner collector mounted on the inner wall of the nacelle, and an outer collector mounted on the outer wall of the nacelle. These collectors would be connected to each other by one or more lines that would pass through the space 38 of the nacelle according to a direction that could be radial or oblique or even parallel to a surface of the nacelle. The arrangement of only one or two lines would free up space inside the nacelle between the two parts of the collector, so that if necessary, equipment encroaching on this free space could be integrated or other pipes or electrical harnesses could pass through it.

The network(s) of pipes 42 of the inner wall 34 of the nacelle are not necessarily radially opposite the networks of pipes 42 of the outer wall 36. In other words, inner and outer air-liquid heat exchangers, respectively, can be separated from each other in the longitudinal and/or circumferential direction of the nacelle. Therefore, a liquid outlet of a network of pipes from the inner wall is not necessarily in front of a liquid intake of a network of pipes from the outer wall with which the liquid outlet is connected in series. In the above-mentioned case of an inner collector (mounted on the inner wall of the nacelle) connected to an outer collector (mounted on the outer wall of the nacelle), the connecting line or lines between the inner and outer collectors may be relatively long according to the longitudinal and/or circumferential direction of the nacelle. In this case too, it may be preferable to have a single feed ramp and a single collection ramp.

The FIG. 10 illustrates another embodiment of the invention in which a single liquid cooling circuit formed by the networks of pipes 42 is provided on the nacelle. The network of pipes 42 of each inner or outer wall 34, 36 of the nacelle extends in the circumferential direction over only part of this wall. In the example shown, each network extends over an angle of about 120° around the axis 24. Following the above explanations for the example in the FIG. 9, it is understood that at least one oil outlet from the network of pipes of the inner wall is connected in series with at least one oil intake from the network of pipes of the outer wall through at least one collector 48 located around 4 or 5 o'clock. The oil leaving line 54 is connected to the pipes of the inner wall 34 by at least one feed ramp 46 located at 12 o'clock at the radially outer end of the ancillaries arm 52. The oil return line 56 is connected to the pipes of the outer wall 36 by at least one collection ramp, which is also located at 12 o'clock.

Figure 11:
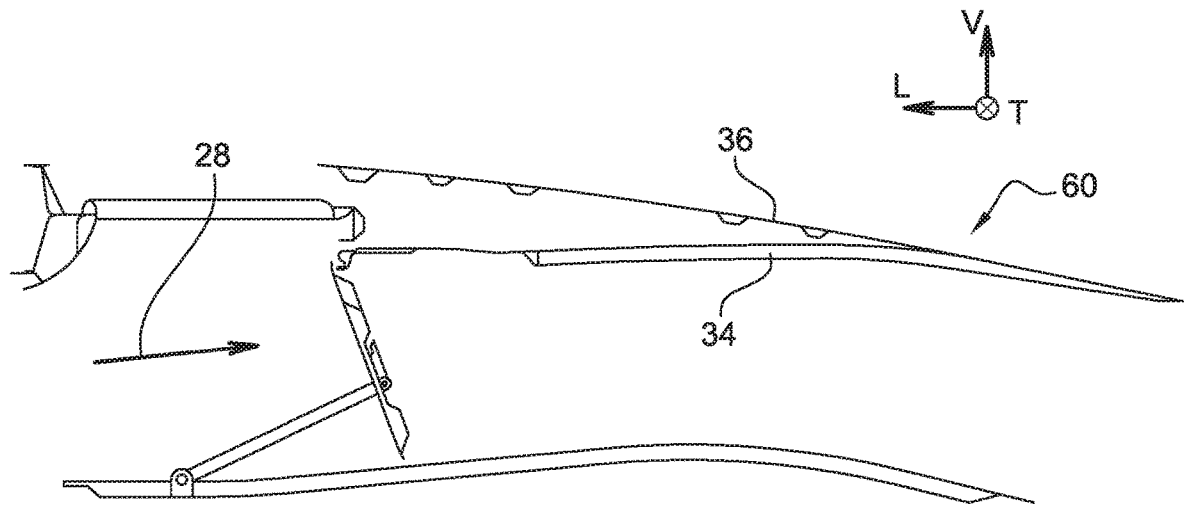
FIG. 11 is an enlarged view of a detail from FIG. 1, and illustrates a downstream end of a nacelle equipped with networks of pipes.
Figure 12:
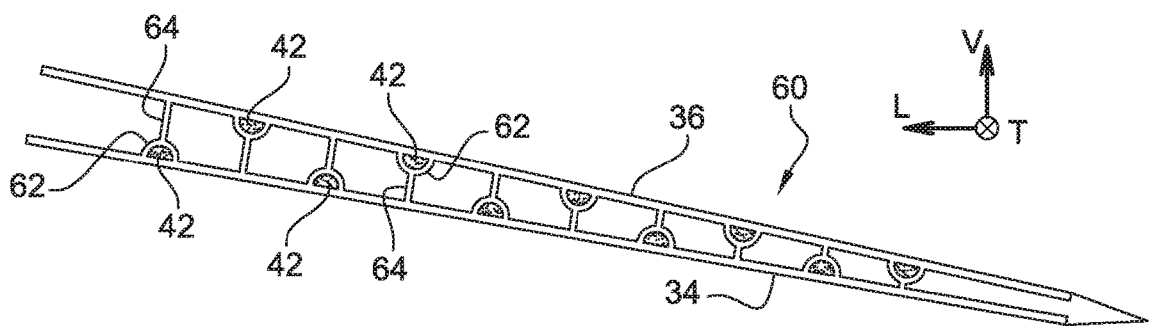
FIG. 12 is a larger scale view of a part of FIG. 11.

The FIGS. 11 and 12 illustrate another embodiment of the invention, applied to the downstream end of the nacelle 26 of FIG. 1. FIG. 11 is a detailed view of the framed portion of FIG. 1 and shows a downstream ferrule 60 of the nacelle formed by the approach and junction of the downstream ends of the walls 34, 36.

The nacelle 26 comprises a sliding-cover thrust reverser. The sliding cover carries the ferrule 60, which can then be moved in translation with respect to the oil supply ramps, which are arranged on a fixed part of the nacelle 26.

The oil is circulated to the network(s) of pipes 42 by means of a pumping device (not shown). The pipes 42 extend circumferentially around the axis 24 of the ferrule 60.

The width of each pipe is between one and one hundred millimetres for example. The term "width" is to be understood as the width according to the longitudinal section of the pipe concerned.

For efficiency reasons, the ferrule 60 and the pipes 42 are made of a material that is adapted to effectively dissipate calories.

According to a preferred example of embodiment, the ferrule 60 and the pipes 42 can also be made of composite material or titanium.

The FIG. 12 shows networks of pipes 42 with semi-circular cross-section. The inner wall 34 carries at least one network of pipes 42 and the outer wall 36 carries at least one network of pipes 42.

The pipes 42 of the wall 34 are arranged in regular alternation with the pipes 42 of the wall 36, as shown in the drawing.

Each pipe 42 is bounded by a partition 62 formed integrally with the corresponding wall 34, 36, this partition 62 having a generally curved shape whose concavity is oriented towards the corresponding wall 34, 36. Each partition 62 of one wall is connected by a rib 64 to the other wall, the rib 64 also being formed integrally with the walls 34, 36. Each rib 64 extends from the top of the convexity of each partition 62 to the opposite wall 34, 36 and extends substantially in a normal plane to this opposite wall.

This design optimizes the temperatures of the walls 34, 36 in order to maximize the thermal power exchanged via the pipes 42.

The ferrule 60 can be obtained by a manufacturing method of the extrusion-type that produces a profile that is then bent into a ferrule 60 shape, or the ferrule 60 can be obtained directly by pultrusion.

The mixed architecture adopted in the above-mentioned examples of embodiments according to the invention, putting in series heat exchangers each composed of liquid pipes in parallel located on an outer wall or an inner wall of the nacelle, with a direction of circulation passing the liquid first through the exchanger(s) of the inner wall then through the exchanger(s) of the outer wall, allows to make the coupled use of the inner and outer surfaces of a nacelle as heat exchange surfaces feasible and beneficial. The conventional parallel architectures do not provide sufficient heat exchange. The same applies to series architectures that do not ensure the manufacturability of the exchange walls due to pressure limitations due to excessive pressure drop.

The proposed mixed architecture is optimal because it ensures both a satisfactory heat dissipation of the calories of the liquid, and a reduction in the number of surfaces used, while being robust to the phenomena of flow rate heterogeneities. In a particular example of embodiment in which the networks of pipes 42 transport engine oil, this mixed architecture has resulted in the following gains (on a target heat dissipation requirement):

weight saving of 12 kg of on-board oil,
reduction in the number of surfaces used: six unit exchange surfaces (per pipe) out of the twenty unit exchange surfaces required in parallel architecture, i.e. a 70% reduction in the mass of the structure by reducing in particular the number of pipes,
fewer pipes in parallel, i.e. simpler flow rate distribution between pipes, and a reduction in the number of interfaces and pipes, and
harmonization of exchanges in the pipes at all flight points, i.e. less heterogeneity of flow rate, each surface block working under similar conditions.

The invention claimed is:

1. A propulsion assembly for aircraft, comprising a turbomachine surrounded by a fan nacelle comprising an annular air intake lip extending around the turbomachine by two annular walls, inner and outer, respectively, configured to be swept across by air flows at least when the aircraft is in flight, wherein:
said inner wall comprising or supporting at least one inner network of pipes and said outer wall comprising or supporting at least one outer network of pipes, the at least one inner network of pipes and the at least one outer network of pipes being configured to transport a liquid in contact with said inner wall or said outer wall to form air-liquid heat exchangers respectively inner and outer, the pipes of each inner or outer heat exchanger being connected in parallel with each other,
one of the inner networks of pipes having at least one liquid outlet connected in series with at least one liquid intake of one of the outer networks of pipes, and
the propulsion assembly comprises means for circulating the liquid, connected fluidly to at least one liquid intake of at least one of the inner networks of pipes for its liquid supply, and connected to at least one liquid outlet of at least one of the outer networks of pipes for the recovery of the liquid,
wherein the pipes of the or each inner networks are fluidly supplied in parallel by a respective first inner collector or a respective feed ramp of the means for circulating the liquid arranged in an annular space of the fan nacelle defined between the inner wall and the outer wall of the fan nacelle,
wherein said inner wall comprises or supports a plurality of the inner networks of pipes and said outer wall comprises or supports a plurality of the outer networks of pipes, wherein each inner network of pipes is fluidly connected in series to a respective outer network of pipes such that at least one liquid outlet of each inner network of pipes is fluidly connected to at least one liquid intake of the respective outer network of pipes, and wherein for all inner networks at least one liquid intake of each inner networks is fluidly supplied in parallel by the respective first inner collector or the respective feed ramp and for all outer networks at least one liquid outlet of each outer network is fluidly connected in parallel to a respective first outer collector or respective collection ramp of the means for circulating the liquid.

2. The propulsion assembly according to claim 1, wherein the turbomachine is connected to the fan nacelle by at least one tubular arm of the means for circulating the liquid for passage of ancillaries, said at least one liquid intake of the inner network of pipes and said at least one liquid outlet of the outer network of pipes being located at the level of the arm.

3. The propulsion assembly according to claim 2, wherein said arm is located at 12 o'clock by analogy with the dial of a clock.

4. The propulsion assembly according to claim 3, wherein said at least one liquid outlet of at least one of the inner network of pipes is connected to said at least one liquid intake of at least one of the outer network of pipes by at least one respective second outer collector and said at least one respective second outer collector is located at 6 o'clock by analogy with the dial of a clock.

5. The propulsion assembly according to claim 1, wherein said inner and outer networks of pipes have a generally curved or annular shape and said outer network of the pipes extends around the inner network of pipes.

6. The propulsion assembly according to claim 5, wherein the inner and outer networks of pipes are segmented and each comprises at least two sectors.

7. said at least one liquid outlet of the inner network of pipes is connected to said at least one liquid intake of the outer network of pipes by at least one collector.

8. The propulsion assembly according to claim 1, wherein said at least one liquid outlet of one of the inner networks of pipes is connected to a second inner collector and said at least one liquid intake of one of the outer networks of pipes is connected to a second outer collector, said second inner collector and said second outer collector being connected together.

9. The propulsion assembly according to claim 1, wherein said liquid intake of each inner network of pipes is connected to the respective feed ramp and said liquid outlet of each outer network of pipes is connected to the respective collection ramp.

10. The propulsion assembly according to claim 1, wherein at least one sheet metal is mounted and fixed to each of said inner and outer walls and is shaped to define at least one of said inner networks of pipes and at least one of said outer networks of pipes, respectively.

11. The propulsion assembly according to claim 10, wherein the respective collectors and/or respective ramps are mounted and fixed to said inner and outer walls.

12. The propulsion assembly according to claim 1, wherein the at least one inner network of pipes of the fan nacelle and the at least one outer network of pipes of the fan nacelle are each arranged between the inner wall and the outer wall of the fan nacelle.

13. The propulsion assembly according to claim 1, wherein the at least one inner network of pipes is comprised or supported by a radially outwardly surface of the inner wall and the at least one outer network of pipes is comprised or supported by a radially inwardly surface of the outer wall of the fan nacelle.

14. The propulsion assembly according to claim 1, wherein the fan nacelle surrounds a fan of the turbomachine.

15. The propulsion assembly according to claim 1, wherein the pipes of each inner heat exchanger are connected fluidly to each other in parallel such that for each inner heat exchanger all the liquid outlets of the pipes of one network of the inner wall are connected fluidly to each other and all the liquid inlets of the pipes of one network of the inner wall are connected fluidly to each other and wherein the pipes of the or each outer heat exchanger are connected in parallel with each other such that such that for each outer heat exchanger all the liquid outlets of the pipes of one network of the outer wall are connected fluidly to each other and all the liquid inlets of the pipes of one network of the outer wall are connected fluidly to each other.

16. The propulsion assembly according to claim 1, wherein the heat exchangers of a same inner wall or a same outer wall are connected fluidly to each other in series or in parallel.

17. The propulsion assembly according to claim 1, wherein a radially outer surface of the inner wall comprises or supports said at least one inner network of pipes and a radially inner surface of said outer wall comprises or supports said at least one outer network of pipes.

* * * * *